United States Patent [19]

Morrison et al.

[11] 4,175,430
[45] Nov. 27, 1979

[54] LOAD MEASURING APPARATUS

[75] Inventors: William R. B. Morrison; Richard F. Beale, both of Brisbane, Australia

[73] Assignee: Utah Development Company, San Franciso, Calif.

[21] Appl. No.: 892,402

[22] Filed: Mar. 31, 1978

[30] Foreign Application Priority Data

Apr. 4, 1977 [AU] Australia ............................... PC9670

[51] Int. Cl.² .............................................. G01L 1/04
[52] U.S. Cl. ............................................... 73/141 A
[58] Field of Search .................... 73/141 A; 212/39 R

[56] References Cited

U.S. PATENT DOCUMENTS

| 3,613,441 | 10/1971 | Papirno | 73/141 A |
| 3,962,911 | 6/1976 | Grenlund | 73/141 A |

Primary Examiner—Anthony V. Ciarlante
Attorney, Agent, or Firm—J. Harold Nissen

[57] ABSTRACT

There is provided load measuring apparatus for determining loads applied to a rolling element bearing. A rolling element of such a bearing is provided with a substantially centrally disposed cavity within which is supported sensing means adapted to monitor a dimension of said cavity. When a bearing is loaded, the rolling elements will distort and the applied load is a function of the amount of distortion of the rolling elements. The load measuring apparatus is calibrated to provide the load from the output of the sensing means.

16 Claims, 6 Drawing Figures

LOAD MEASURING APPARATUS

This invention relates to load measuring apparatus and in particular it relates to means of and apparatus for measuring rolling element bearing loads.

The present invention is particularly suitable for monitoring bearing loads in very large bearings such as those used in large earth moving machinery and the like. In open-cut mining operations, for example, the use of very large draglines is common place and in general such apparatus comprises an upper boom supporting body supported rotatably on a mobile lower body by means of a large rolling element slew bearing. Such apparatus has to, in use, traverse uneven surfaces and as a result of the inevitable flexing of the machine, the loads transmitted through any particular rolling element of the bearing assembly may at any instance be extremely high and is often sufficient to cause failure of the bearing or the bearing support structure. Of course, when such failure occurs in a large machine, such as a dragline, it is difficult to effect repairs and the downtime of the machine is costly to the operator.

In the past, attempts have been made to ascertain the loads which may be transmitted by the rolling element of a bearing assembly and such attempts have included taking strain readings at selected positions of the support structure for the bearing race and from these readings inferring the load transmitted through the bearing. Many factors have to be assumed in the calculation of the inferred maximum load on any one bearing element, and thus the load which is calculated to be transmitted by a particular bearing element may be inaccurate. It is, of course, desirable to have a complete understanding and knowledge of the actual maximum loads which may be applied to a bearing to enable the designers of machinery utilising such bearings to produce designs which will be economical to manufacture and operate.

Accordingly, the present invention aims to provide means of an apparatus for measuring rolling element bearing loads. Furthermore, the present invention aims to provide apparatus for measuring and recording instantaneous bearing loads or of the loads on individual components thereof. In particular, the present invention aims to provide means of an apparatus capable of measuring the instantaneous loads of in situ bearing elements in their normal working environment. Other objects and advantages of the invention will hereinafter become apparent.

The present invention is described with particular reference to its application to measuring the loads of a dragline slew bearing, but of course its application is not limited thereto.

In the main slew bearing of a dragline, the bearing diameter of the raceways may be fifteen meters or more in diameter and the rollers are supported in spaced circumferential relationship therearound between inner and outer cage members by means of a pin or axle for each roller fixed between the inner and outer cage members. As it is not possible to build the support structure sufficiently rigid so that the raceways will not distort in use, the pins may be a loose fit in the bore of the rollers to enable the rollers to float with respect to the cage to accommodate the distortion of the raceways or each pin may be a close fit in the bore of each rollerr and supported between a flexible cage structure whereby the cage will distort to enable the rollers to conform to the distorted raceways to maximise load sharing.

Conventionally, the top and bottom raceways are formed from a plurality of prefabricated sections machined in situ to the desired flatness. The bottom raceway is continuous and the top raceway is provided with a gap for access to the rollers. By utilising the present invention, the working load of the or each roller can be monitored by arranging gauging apparatus in the selected roller station. It has been found that a small variation in the diameter of a roller causes greatly increased loads on the particular roller or the surrounding rollers and thus it is preferred to utilise an original roller for load gauging operations. Of course, this is not essential and a complete gauging roller assembly could be substituted for the original roller for gauging operations if desired. This invention is also applicable to large ball bearings.

With the foregoing and other objects in view, this invention resides broadly according to one aspect in a method of determining rolling element bearing loads comprising the steps of, arranging in a rolling element bearing assembly a rolling element having a cavity disposed substantially centrally therein; supporting within said cavity sensing means adapted to monitor a dimension of said cavity which varies with variations in the load applied to said bearing assembly, and providing communication means associated with said sensing means and adapted to provide said monitored dimension in a form interpretable as the load applied to said rolling element.

In another aspect, the present invention resides in or for a rolling element having a cavity formed substantially centrally therewithin and comprising one of a plurality of rolling elements co-operating with oppositely arranged raceways to form a rolling element bearing assembly:

measuring apparatus for determining the load applied to said one rolling element, including sensor means adapted to be supported in said cavity to monitor a dimension of the cavity which varies with variations in the load applied to said bearng assembly and communication means operatively associated with said sensing means in such manner as to provide said monitored dimension in a form interpretable as the load applied to said one rolling element.

In another aspect, the present invention resides in a roller bearing assembly comprising a plurality of rolling elements supported between oppositely arranged raceways and including one said rolling element having a substantially centrally disposed cavity; sensing means supported within said cavity to monitor the dimension of said cavity which varies with variations in the load applied to said bearing assembly, and communication means operatively associated with said sensing means and adapted to provide said monitored dimension in a form interpretable as the load applied to said rolling element.

In another aspect, the present invention resides in a machine having an upper body and a lower body supported for relative rotation about a substantially vertical axis by means of a slew bearing assembly, the latter comprising a plurality of rolling elements supported between oppositely arranged raceways and including one said rolling element having a substantially centrally disposed cavity, and sensing means supported within said cavity to monitor the dimension of said cavity which varies with variations in the load applied to said bearing assembly, and communication means operatively associated with said sensing means and adapted to provide said monitored dimension in a form interpretable as the load applied to said rolling element.

In order that the invention may be more readily understood and put into practical effect, reference will now be made to the accompanying drawings which illustrate an embodiment of the invention and wherein.

Figure 1:
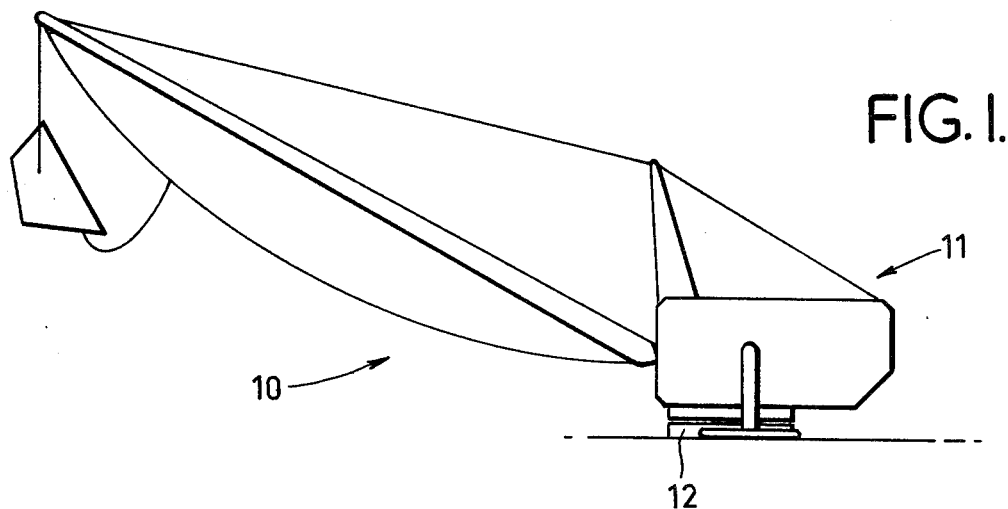
FIG. 1 is a side elevation of a typical dragline.
Figure 2:
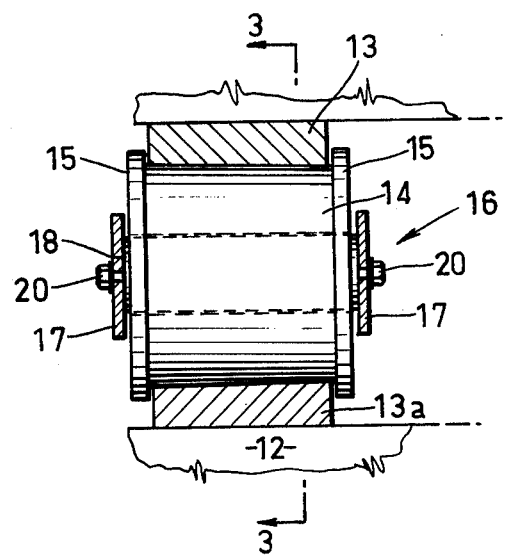
FIG. 2 is a section through the slew bearing of the dragline.

The present invention is illustrated in its application to monitoring the dynamic or static loads imposed on the slew bearing assembly 10 of a dragline 11. It will be appreciated from the foregoing description that the loads on the slew bearing assembly 10 may be greatly increased under abnormal operating conditions such as when the dragline 11 is operating with its tub 12, which supports slew bearing assembly 10, supported on an uneven surface, causing distortion of the raceways of the bearing assembly 10. Typically, the individual rolling elements 14 of the slew bearing assembly which are tapered to provide a true rolling surface and which have inner and outer end flanges 15 to locate the rollers operatively between the tracks 13 and 13a. The rolling elements 14 are located in operative spaced relationship around the slew bearing by means of a cage assembly 16 which comprises inner and outer annular plates 17 bolted about spaced axles or pins 18 which extend through the respective bores 19 of the rollers 14. In such a construction, it is normal to provide considerable clearance between the locating pin 18 and the bore 19 of each roller so as to enable the rolling element 14 a degree of float to accommodate distortion of the raceways 13 and 13a. During operation, the rolling elements distort according to the amount of load placed thereupon and the present invention utilises the distortion of the bore 19 of a rolling element as a means for providing information interpretable as the operative load applied to that roller.

Figure 4:
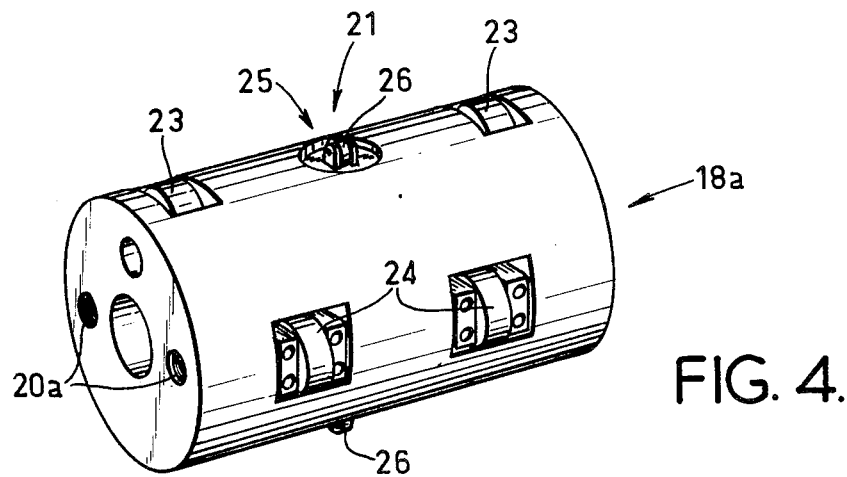
FIG. 4 is a perspective view of the locating axle assembly of measuring apparatus according to the present invention.
Figure 3:
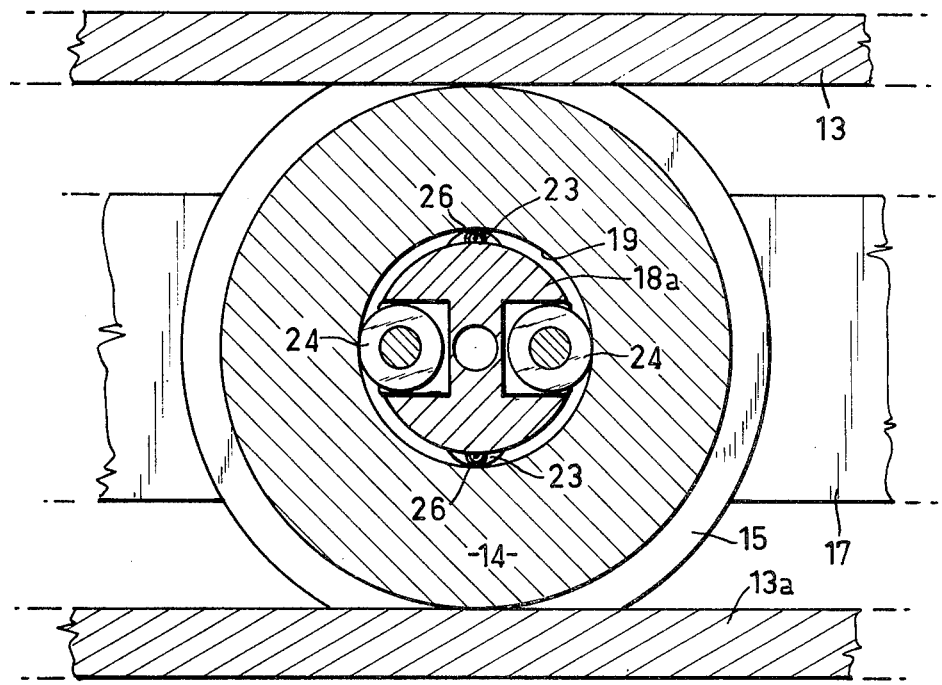
FIG. 3 is a sectional view along the line 3—3 of FIG. 2.
Figure 5:
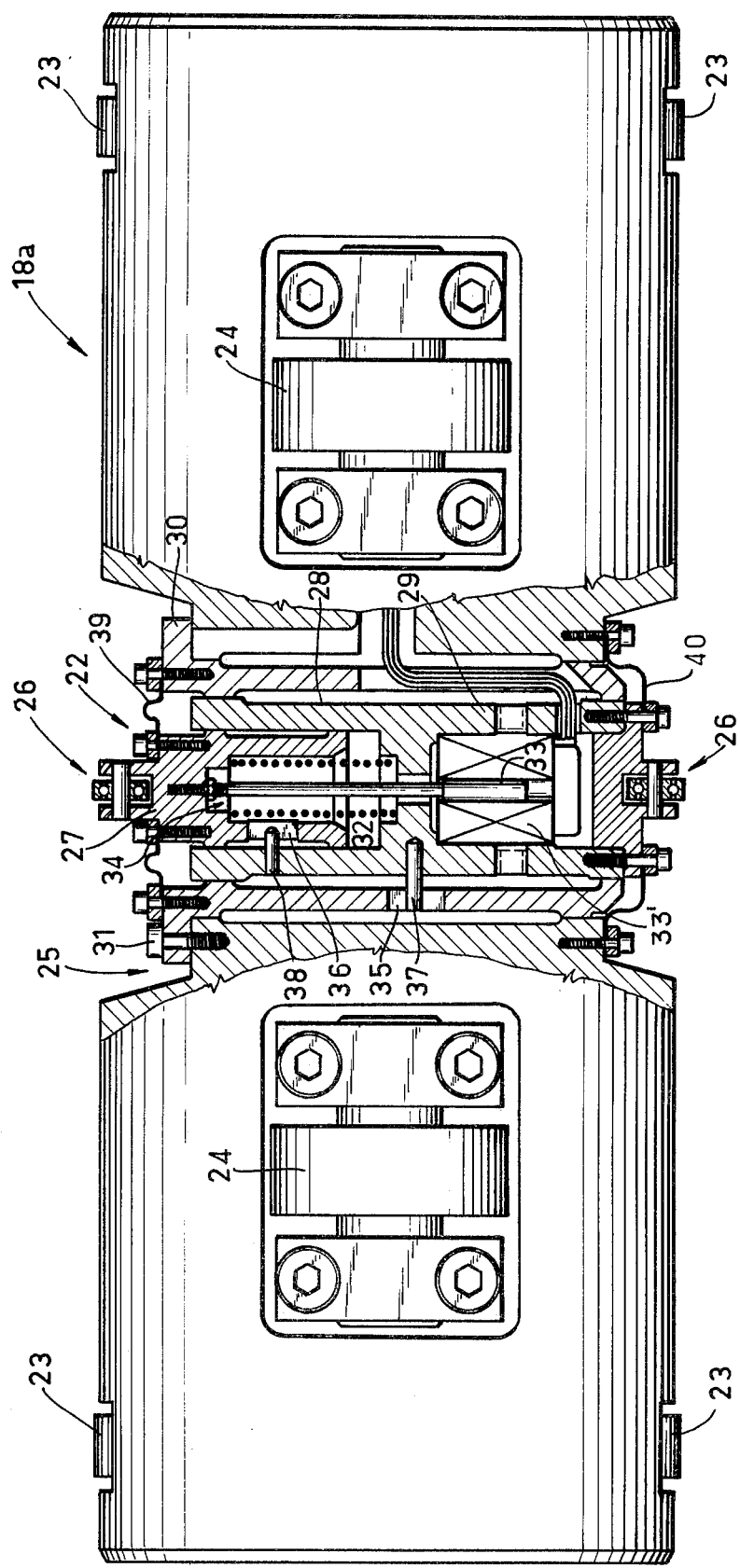
FIG. 5 is a cut-away view of the locating axle assembly illustrated in FIG. 4.

In the method of load measuring according to the present invention, a rolling element 14 of the slew bearing asembly 10 is removed through a top gap provided in the upper raceway 13 after freeing the locating pin 18 by removing the locating bolts 20 and this rolling element is replaced by a substantially identical one modified by having an accurately ground cylindrical bore 19. This modification may be performed on the original rolling element or a replacement test assembly may be utilised if desired. The solid locating pin 18 is replaced with the locating pin assembly 18a as illustrated in FIG. 4 and FIG. 5 and which incorporates sensing means 21 in the form of telescopic gauging assembly 22 to monitor the diameter of the ground cylindrical bore 19. As shown, the locating pin assembly 18a is tapped at 20 at each end to enable it to be bolted between the annular plates 17 in lieu of the original solid locating pin 18.

The diameter of the locating pin assembly 18a is considerably under size and the pin 18a is provided at each end with pairs of oppositely disposed locating rollers at the top and bottom at 23 and at the sides at 24, as shown. These locating rollers and in particular the side locating rollers 24 are shim adjustable to provide the desired clearance within the bore 19 of the rolling element 14. The sensing means 21 is slidable in the vertical direction within an aperture 25 which extends diametrically through the centre of the locating pin assembly 18a so as to be able to gauge the variation in the vertical dimension of the bore 19 as the latter is distorted to an oval shape by the load transmitted through the raceways 13 and 13a. The ovality of the bore 19 varies proportionately with the load applied to the rolling element 14 and the sensing means 21 is located so as to accurately gauge the maximum vertical dimension of the bore.

The shim adjustable locating rollers, and in particular the side locating rollers 24, are provided so that the side play between the locating pin assembly 18a and the bore 19 may be controlled within allowable limits. Of course, if side movement was excessive, then the sensing means would measure a dimension somewhat less than the maximum vertical dimension of the bore and this would lead to inaccuracies in the gauged load.

As shown the outer bore engaging ends 26 of the telescopic gauging means 22 are constituted by the respective outer face of deep grooved ball bearings supported with their axes parallel to the axis of rotation of the rolling element 14. The top telescopic member 27 is slidable within the upper sleeve portion 28 of the lower telescopic member 29 which is supported within a flanged tubular support housing 30 adapted to be bolted into the aperture 25 in the pin 18a by means of the bolts 31 passing through the top flange of the housing 30 and into the pin assembly 18a. The lower telescopic member 29 is freely slidable in the vertical direction within the support housing 30 and the upper telescopic member 27 is freely slidable in the vertical direction in the sleeve 28 formed in the upper portion of the lower telescopic member 29. A compression spring 32 is interposed between the upper and lower telescopic members 27 and 29 so as to maintain them in their telescopically extended position to ensure that the bearings 26 maintain contact with the respective upper and lower faces of the bore 19.

It will be appreciated that in operation, as the roller rotates, the projected shape of the bore of the roller will be unaffected by the rotational position of the roller but will depend upon the load applied thereto so that the gauged vertical bore dimension will accurately reflect the load applied to the roller. Of course, however, due to distortion of the raceways or to inaccuracies in manufacture, the locating pin assembly 18a and the rolling element 14 may become eccentrically disposed. However, the telescopic gauging assembly 22 is self centralising as it is freely slidable in the support housing 30 and the gauged bore dimension will be unaffected by such eccentricity.

In the embodiment illustrated in FIG. 5, the communication means, which provides the gauged dimension in a form interpretable as the operative load applied to said rolling element, is a linear displacement transducer assembly comprising a transducer body 32 supported fixedly in the lower portion of the lower telescopic member 29 and a core 33 fixed to the upper telescopic member 27. As the telescopic members 27 and 29 telescope, the relative position of the core 33 and the transducer body 33' is varied to give the required output signal. The attachment 34 of the core 33 to the upper telescopic member 27 is adjustable so that the apparatus can be calibrated. This is achieved by subjecting the roller to a known load and calibrating the output normally. Normally such calibration is done in a laboratory with accurate testing facilities.

Furthermore, it will be seen that the support housing 30 is slotted at 35 and the upper telescopic member 27 is slotted at 36 and co-operating locating pins 37 and 38 respectively extend into the slots from the lower telescopic member 29. The purpose of this arrangement is to maintain the axes of the roller bearings 26 parallel to the axis of rotation of the rolling elements 14. The output leads from the linear displacement transducer body 33' are led through cutouts in the lower telescopic member 29 and the support housing 30 and the body of the locating pin 18a. The leads exit through the tunnel 41 to a radio transmitter which is supported on the cage assembly and transmits to a remote monitoring station. As shown, flexible diaphragm type seals 39 and 40 are provided at each end of telescopic gauging assembly 22 and the locating pin 18a to exclude ingress of foreign matter in the working components thereof.

Figure 6:
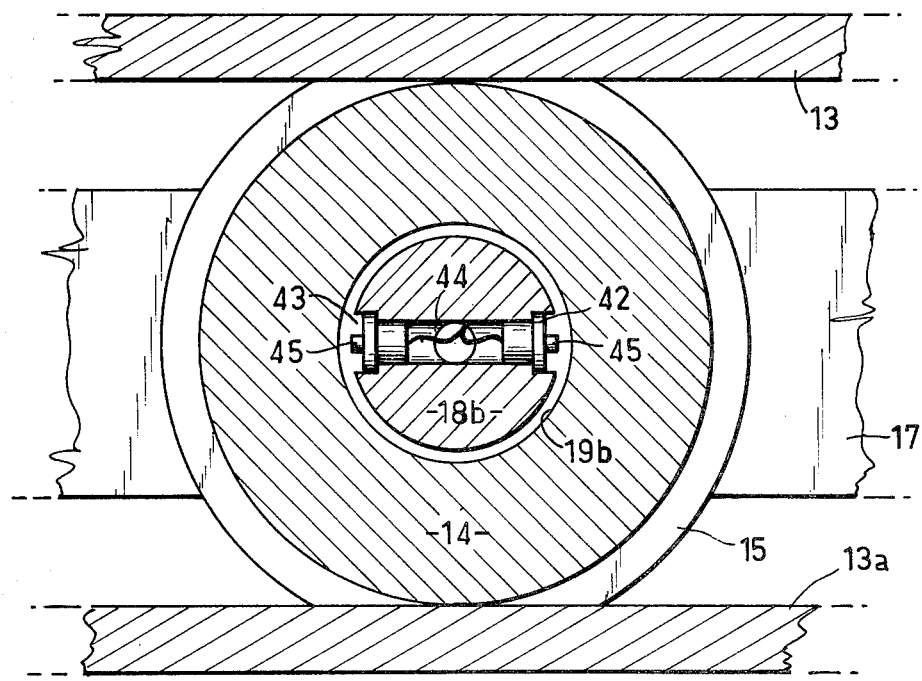
FIG. 6 is a view similar to FIG. 3, but illustrating an alternate embodiment of the invention.

In the embodiment illustrated in FIG. 6, the sensing means comprises a pair of contactless transducers 42 and 43 supported in a horizontally extending aperture 44 in the locating pin assembly 18b. The outer end portions 45 of the contactless transducers 42 and 43 are spaced from the bore 19b of the rolling element 14 and the arrangement is such that the electrical output from the transducers varies linearly with the gap between the respective transducer and the bore 19b. The outputs of the transducers are summed to gauge the actual variation in the horizontal dimension of the bore. The contactless transducers may utilize, for example, a magnetic effect, an eddy current effect or a capacitive effect. Furthermore, the tranducing means may utilise pneumatic effects by, say, monitoring changes in back-pressure with variations in the ovality of the bore, or hydraulic effects or acoustic effects, whichever is appropriate to the particular application.

The load measuring apparatus of the present invention could be applied equally to spherical rolling elements of a bearing assembly and of course in such application it may be desirable to sense the maximum dimension taken in the direction of the applied load or any other fixed direction of a spherical or part spherical cavity.

The readout meter or other communications means which is operatively connected to the sensing means, in the illustrated embodiment, by telemetry means is preferably calibrated to give a direct reading of the load applied to the roller, and this readout could, say, be placed in the operator's cabin so that it could be constantly monitored by the operator to ensure that the machine was not operated beyond its capacity, or it could be used in a monitoring device for an automatic fail safe system. Of course, the readout could be connected directly to the transducing apparatus.

More than one monitored roller could be installed, say three equally-spaced rollers could be provided with the necessary fittings and adapted to feed to a computer means to give a direct output indicating the actual loads and, say, lateral and transverse position of the instantaneous centre of gravity of the machine. This could be beneficial in controlling the operation of the machine and perhaps its counterweights, and in utilising the machine to maximum efficiency. Alternatively, the outputs from the three monitored rollers could be monitored and displayed by a single display to indicate the maximum load and thereby reduce the occurrence of overloading the apparatus.

Also, the major and minor axes of the distorted bore of a rolling element may be monitored simultaneously, if desired.

It will of course be realised that while the above has been given by way of illustrative example, many modifications of constructional detail and design could be made by persons skilled in the art without departing from the broad scope and ambit of the invention as is defined in the appended claims.

We claim:

1. A method of determining the load applied to a rolling element of a bearing assembly of the type having a plurality of rolling elements located in operative spaced arrangement between oppositely arranged bearing rails by a cage assembly, said method comprising the steps of:

arranging in the bearing assembly a rolling element having a cavity disposed substantially centrally therein;

providing support means fixed to the cage assembly to extend into said cavity;

operatively supporting sensing means on said support means to monitor a dimension of said cavity which varies with variations in the load applied to said bearing assembly, said sensing means being restrained by said support means for movement substantially in the direction of said monitored dimension; and providing communication means associated with said sensing means and adapted to provide said monitored dimension in a form interpretable as the load applied to said rolling element.

2. A method according to claim 1, wherein said cavity is formed symmetrically about the axis of rotation of said rolling element.

3. A method according to claim 2, wherein said communication means includes a linear displacement transducer assembly having a transducer body part supported by one said telescopic member and a movable core assembly supported by the other said telescopic member and adapted to co-operate operatively with said body part.

4. A method according to claim 2, wherein said sensing means includes a contactless transducer supported spaced from the surface of said cavity, and said transducer being of the type adapted to provide an output signal which varies in accordance with the proximity of said transducer with said surface.

5. A method according to claim 2, wherein said monitored dimension extends in the direction of application of said applied load or in a direction mutually perpendicular thereto.

6. A method according to claim 5, wherein said sensing means includes a telescopic gauging assembly having a pair of telescopically co-operating members extending along said monitored direction to make contact at respective opposite ends thereof with the opposing faces of said cavity and said members being biased towards their telescopically extended attitude to maintain contact with said opposing faces and said gauging assembly being supported within said support means for reciprocal movement along said monitored direction.

7. A method according to claim 2, wherein said cavity is cylindrical and said monitored dimension extends at right angles to said axis of rotation.

8. A method according to claim 2, wherein said monitored dimension extends in a direction mutually perpendicular to the direction of said applied load.

9. In a rolling element having a cavity formed substantially centrally therewithin and comprising one of a plurality of rolling elements co-operating with oppositely arranged raceways to form a rolling element bearing assembly;
measuring apparatus for determining the load applied to said one rolling element, including sensing means adapted to be supported in said cavity to monitor a dimension of the cavity which varies with variations in the load applied to said bearing assembly and communication means operatively associated with said sensing means in such manner as to provide said monitored dimension in a form interpretable as the load applied to said one rolling element.

10. The combination of claim 9 for use with a rolling element of the type having a cylindrical bore extending co-axially of said rolling element and adapted to be operatively located by an axle assembly passing through said bore and supported between inner and outer cage members intermediate the bearing raceways, wherein said sensing mean is supported operatively in said cavity by said axle assembly.

11. The combination of claim 10, wherein said sensing means comprises a telescopic gauging assembly slidably mounted in an aperture in said axle assembly and wherein said gauging assembly includes a pair of telescopically co-operating members adapted to extend between and make contact with the opposing faces of said cavity and biased towards their telescopically extended attitude to maintain contact with said opposing faces.

12. The combination of claim 11, wherein said aperture extends in a direction parallel to the axis of said bearing assembly and the outer ends of each telescopic member are each adapted to make contact with the respective said opposing face through a contact roller supported rotatably on the respective said outer end and there being provided locating means on said axle to maintain the axes of rotation of said contact rollers parallel to the axis of rotation of said one rolling element.

13. The combination of claim 12, wherein said communication means includes a linear displacement transducer assembly having a transducer body part supported by one said telescopic member and a movable core assembly supported by the other said telescopic member and adapted to co-operate operatively with said body part.

14. The combination of claim 13, wherein said monitored dimension is measured in the direction of said applied load or in a direction mutually perpendicular thereto and wherein said axle is provided with a pair of locating rollers at each end and disposed at each end at opposite side thereof and arranged to locate said sensing means so as to gauge said monitored dimension in a plane passing through the axis of said cavity and substantially parallel to said direction of said applied load.

15. A roller bearing assembly comprising a plurality of rolling elements supported between oppositely arranged raceways and including one said rolling element having a substantially centrally disposed cavity; sensing means supported within said cavity to monitor the dimension of said cavity which varies with variations in the load applied to said bearing assembly, and communication means operatively associated with said sensing means and adapted to provide said monitored dimension in a form interpretable as the load applied to said rolling element.

16. A machine having an upper body and a lower body supported for relative rotation about a substantially vertical axis by means of a slew bearing assembly, the latter comprising a plurality of rolling elements supported between oppositely arranged raceways and including one said rolling element having a substantially centrally disposed cavity, and sensing means supported within said cavity to monitor the dimension of said cavity which varies with variations in the load applied to said bearing assembly, and communication means operatively associated with said sensing means and adapted to provide said monitored dimension in a form interpretable as the load applied to said rolling element.

* * * * *